(12) United States Patent
Neuhaus et al.

(10) Patent No.: US 6,691,570 B1
(45) Date of Patent: Feb. 17, 2004

(54) DEVICE FOR MEASURING THE MATERIAL LEVEL IN A VESSEL

(75) Inventors: Joachim Neuhaus, Steinen (DE); Werner Thoren, Steinen (DE); Wolfram Lütke, Inzlingen (DE); Ralf Reimelt, Freiburg (DE)

(73) Assignee: Endress & Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/429,198

(22) Filed: Oct. 28, 1999

(30) Foreign Application Priority Data

Jul. 23, 1999 (EP) .............................. 99114510

(51) Int. Cl.⁷ ..................... G01S 13/08; G01F 23/28
(52) U.S. Cl. .................. 73/290 V; 73/290 R; 324/643; 324/644
(58) Field of Search ......................... 73/290 R, 290 V; 324/643, 644

(56) References Cited

U.S. PATENT DOCUMENTS

| | | | | |
|---|---|---|---|---|
| 3,695,107 A | * | 10/1972 | Hertz et al. | 73/290 R |
| 4,489,601 A | * | 12/1984 | Rao et al. | 73/290 R |
| 5,594,449 A | * | 1/1997 | Otto | 73/290 R |
| 5,609,059 A | * | 3/1997 | McEwan | 73/290 R |
| 5,717,337 A | * | 2/1998 | Kelly | 73/290 R |
| 5,948,979 A | * | 9/1999 | Fitsch et al. | 73/290 V |
| 5,986,449 A | * | 11/1999 | Koski | 73/290 V |
| 6,023,970 A | * | 2/2000 | Blaine | 73/290 R |
| 6,155,112 A | * | 12/2000 | Eckert et al. | 73/290 R |
| 6,178,817 B1 | * | 1/2001 | Hewelt et al. | 73/290 V |
| 6,192,752 B1 | * | 2/2001 | Blaine | 73/290 R |
| 6,293,142 B1 | * | 9/2001 | Pchelnikov et al. | 73/290 R |

FOREIGN PATENT DOCUMENTS

| | | |
|---|---|---|
| EP | 307930 | 3/1989 |
| EP | 0780664 A2 | 6/1997 |
| EP | 0866321 A2 | 9/1998 |
| WO | WO-93/24812 | 12/1993 |

OTHER PUBLICATIONS

"New Sensing Techniques Set to Make an Impact", Control & Instrumentation, vol. 19, No. 12, Dec. 1987, pp. 41–43, London, GB.

* cited by examiner

*Primary Examiner*—Daniel S. Larkin
(74) *Attorney, Agent, or Firm*—Bose McKinney & Evans LLP

(57) ABSTRACT

A level measurement device for measuring the level of material inside of a vessel which includes a conductive element, a signal generating unit, and a receiving unit. The conductive element does not come into direct contact with the material being measured. The signal generating unit generates measurement signals which are transmitted along the conductive element. Each of the measurement signals produces an electromagnetic field which travels along the conductive element and is reflected when it reaches the surface of material in the vessel. The reflected electromagnetic field produces an echo signal which travels along said conductive element to the receiving unit. The receiving unit receives the echo signal and determines the level of material in the vessel. The conductive element can be located outside of the vessel. The level measurement device can also include a protective shield which substantially surrounds the sides of the conductive element to prevent interfering radiation from interfering with the signals transmitted and reflected along the conductive element.

19 Claims, 5 Drawing Sheets

DEVICE FOR MEASURING THE MATERIAL LEVEL IN A VESSEL

FIELD OF THE INVENTION

The present invention relates to an apparatus for determining the material level in a vessel. In particular, the present invention relates to a material level measurement apparatus which includes a signal generating unit, a coupling unit, a conductive element, and a receiving/evaluation unit.

BACKGROUND OF THE INVENTION

A material level in a vessel is measured by means of measuring systems that measure different physical quantities. These quantities are then used to derive the desired information regarding the material level. In addition to mechanical sensors, capacitive, conductive, and hydrostatic measuring sensors, and sensors operating on the basis of ultrasonic, microwaves, or other electromagnetic radiation can be used to measure material level.

Many applications, for example, in the petrochemical, chemical, and food industries, require highly accurate measurements of the level of liquids or bulk materials in vessels (tanks, silos, etc.). Increasingly, sensors are used in which short high frequency electromagnetic pulses or continuous microwaves are coupled to a conductive cable sensor and by means of this cable sensor are introduced into the vessel in which the material is stored. This cable sensor can be any type of conductive element.

Physically, this measuring method utilizes the effect occurring at the interface between two different media, e.g. air and oil or air and water. A portion of the guided high frequency pulses or the guided microwaves is reflected at the media interface due to the abrupt change (discontinuity) of the dielectric constants of the two media. The reflected portion is returned via the conductive element to a receiving device. The reflected portion is greater for greater differences between the dielectric constants of the two media. The distance to the interface can then be calculated from the propagation time of the reflected portion of the high frequency pulses or microwaves. Knowing the empty distance of the vessel permits calculation of the material level within the vessel.

Sensors with guided high frequency signals (pulses or waves) are distinguished by significantly lower attenuation compared to sensors that freely emit high-frequency pulses or waves (free-field microwave systems (FMR) or >true radar systems=). The reason is that the energy flow is highly concentrated along the cable sensor or the conductive element. Furthermore, sensors with guided high frequency signals provide higher measurement quality at close range than freely emitting sensors.

A further advantage of sensors with guided high frequency signals is the superior safety and reliability of the level measurement. This is due to the fact that measurement with guided measuring signals is largely independent of the product characteristics of the material (moisture, dielectric constant, material change), the vessel design (materials, geometry, or other operating conditions (dust, deposits, and reflection angle).

SUMMARY OF THE INVENTION

An objective of the present invention is to provide a sensor apparatus with a conductive element in which the conductive element of the sensor does not come into direct contact with the material being measured.

The present invention attains this objective in the following manner. A signal generating unit generates high frequency measuring signals. A coupling unit couples these measuring signals to a conductive element, the length of the conductive element corresponding at least to the maximum level of the vessel. The conductive element is disposed at a predetermined distance to the material in a vessel, the distance being such that the electromagnetic field produced by the measuring signals interacts with the material and is partially reflected when it meets the surface of the material in the vessel. The time characteristic of the reflected echo signals guided along the conductive element are detected by the receiving/evaluation unit and analyzed.

An alternative embodiment of the present invention provides that the conductive element is disposed outside the vessel. In this case, the vessel itself must be made of a non-conductive material at least within a defined sphere of influence of the conductive element. Materials that are typically used are plastics or glass.

The arrangement of the level measuring device outside the vessel has of course a number of obvious advantages. In addition to ensuring simple installation, the arrangement of the measuring device outside the material being measured prevents contamination or, in case of an aggressive material, corrosion of the conductive element. This makes it possible to use inexpensive materials to manufacture the conductive element. Costly encapsulation of the electrical parts of the measuring device may be largely eliminated.

In another embodiment of the present invention, the vessel, or at least a portion of the vessel within the sphere of influence of the electromagnetic field, is structured as a viewing glass which does not interfere with the electromagnetic field, and which can be transparent in the visible part of the spectrum. If the material level is measured directly on a vessel designed as a viewing glass, the invention can also include a conductive shield as an additional element. The shield is located on the opposite side of the viewing glass from the conductive element to ensure that interfering radiation is effectively shielded.

In another embodiment of the present invention, the conductive element is mounted directly on the vessel or the viewing glass by a simple connection. This connection is preferably an adhesive bond in which the conductive element is glued to the outside wall of the vessel or the viewing glass.

Furthermore, a protective shield made of an electrically conductive material is provided either in combination with the above embodiment or alone. The protective shield is positioned such that the conductive element is disposed between the vessel and the protective shield. The protective shield and the conductive element are spatially separate from each other. Preferably, a dielectric material is arranged between the protective shield and the conductive element. In the simplest case, this dielectric material is air. The protective shield can furthermore be constructed in such a way that it almost completely encloses the conductive element on the side facing away from the vessel. The purpose of the protective shield is to provide protection from interfering radiation from the space lying behind the conductive element, which can negatively affect the measuring accuracy of the level measurements.

The conductive element itself can have any shape as viewed in cross-section. It can for instance be circular, semi-circular, or polygonal. It is preferable that the conductive element be made of at least two conductors, whereby at least one of the two conductors is connected to ground. Improved measuring results are achieved particularly in the case where the conductive element is mounted outside the vessel and is moreover shielded from interfering radiation from the exterior by a protective shield. The reason is that in a multi-part embodiment of the conductive element, the electromagnetic field extending into the vessel is less strongly influenced by the protective shield.

While the above-described embodiments of the present invention describe the arrangement of the conductive element on the outside of the vessel, an alternative embodiment described below relates to an arrangement of the conductive element inside the vessel. In particular, a dielectric sheath or sleeve surrounds the conductive element at least in the area up to the maximum level of material in the vessel. Furthermore, the distance of the conductive element from the material to be detected is dimensioned in such a way that the measuring signal interacts with the material and is partially reflected when it strikes the surface of the material.

A desired distance between the conductive element and the material may be realized either through the selection of the thickness of the dielectric material and/or through the distance of the material from the conductive element located within the dielectric material. Furthermore, the conductive element may be disposed inside a sleeve made of a non-conductive material. The sleeve is placed inside the vessel and the conductive element is subsequently introduced into the sleeve. However, the conductive element and the sleeve may also be designed as a single unit that is then introduced into the vessel. For example, the conductive element may be surrounded directly by the non-conductive material.

BRIEF DESCRIPTION OF THE DRAWINGS

The invention will be explained in detail by means of the following drawings.

DETAILED DESCRIPTION OF PREFERRED EMBODIMENTS OF THE INVENTION

Figure 1:
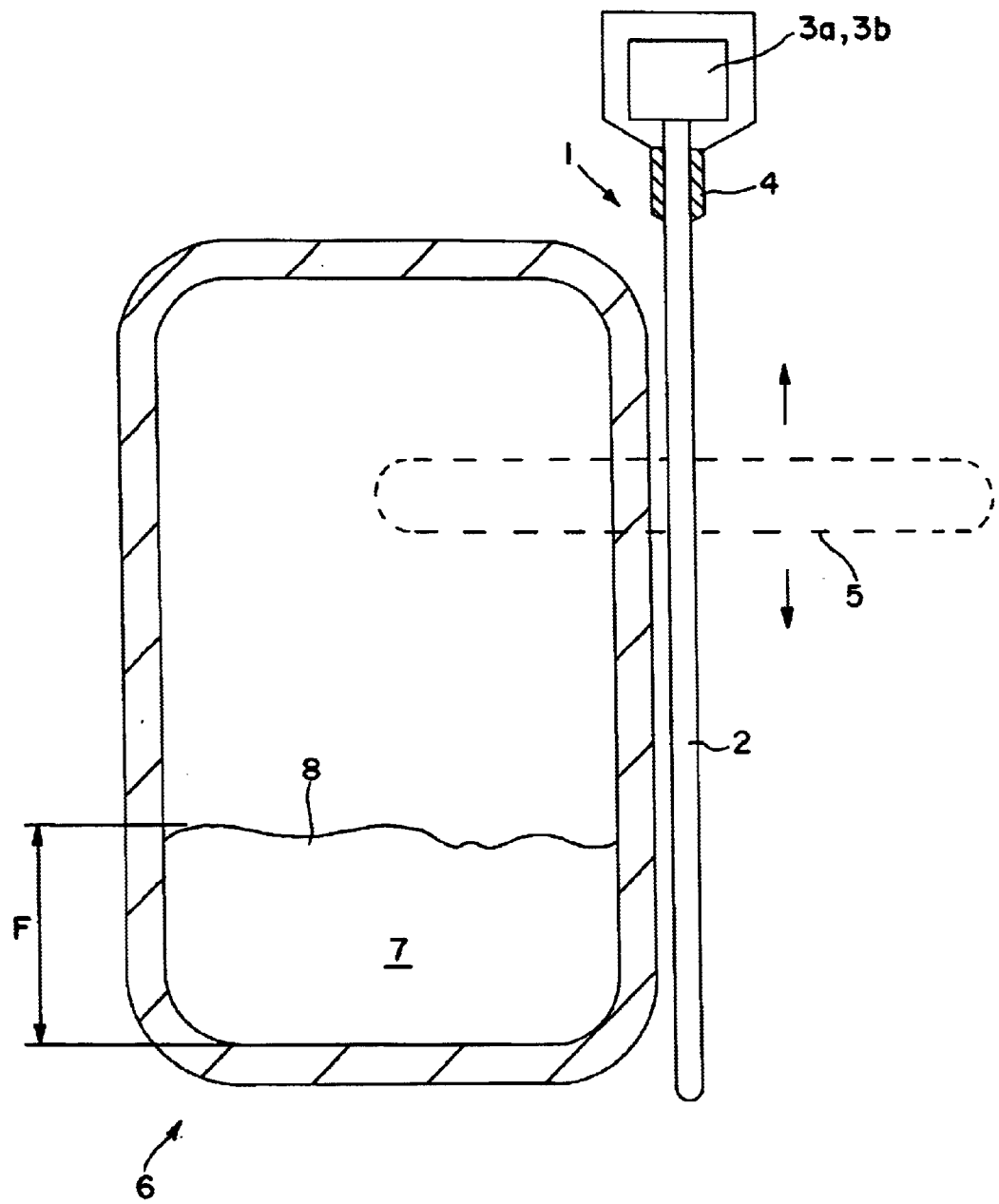
FIG. 1 shows a longitudinal section of a first embodiment of the present invention.

FIG. 1 shows a longitudinal section of a first embodiment of the present invention. The level measuring device 1 comprises a signal generating unit 3a, a coupling unit 4, a conductive element 2 and a receiving/evaluation unit 3b. Measuring signals generated in the signal generating unit 3a are coupled via the coupling unit 4 and guided along the conductive element 2. The conductive element 2 is mounted outside a vessel 6 by means of any type of connection, the connection not being specifically depicted in the drawing. A direct connection between the vessel 6 and the conductive element 2 is not required since the electromagnetic field 5 accompanying the measuring signals along their path covers a relatively large area in space. The vessel 6, at least in the main sphere of influence of the electromagnetic field 5, is made of a non-conductive material (e.g. glass, plastic, etc.).

As briefly described above, the measuring signals guided along the conductive element 2 produce an electromagnetic field 5 in the surrounding space. The electromagnetic field 5 is coaxially aligned and moves parallel to the longitudinal axis of the conductive element 2. Due to the abrupt change of the dielectric constants at the junction between the media, for example, air and material 7, the electromagnetic field 5 is partially reflected as soon as it comes into contact with the surface 8 of the material 7. The echo signals returned along the conductive element 2 are received in the receiving/evaluation unit 3b. The propagation time of the measuring/echo signals permits calculation of the distance traveled. Knowing the distance between the coupling unit 4 and the floor of the vessel 6 makes it possible to determine the level of material 7 in the vessel 6.

Figure 2:
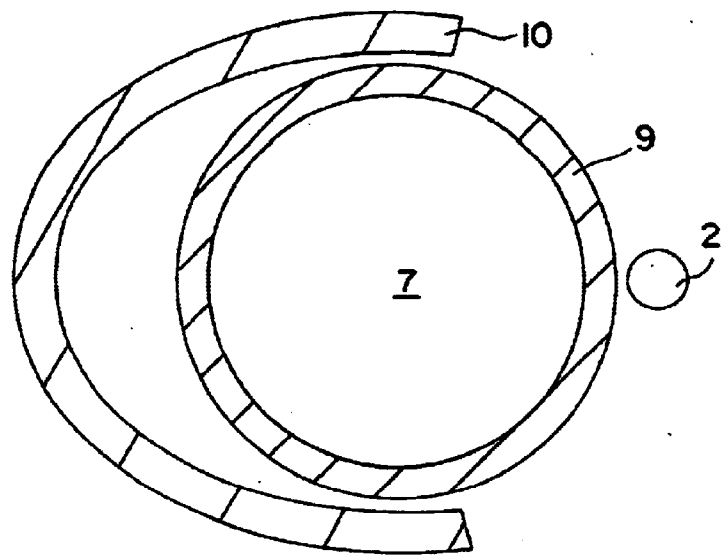
FIG. 2 shows a cross-section of a second embodiment of the present invention.

FIG. 2 shows a cross-section of a second embodiment of the present invention. Material 7, the level of which is being measured, is located inside a viewing glass 9. The viewing glass 9 is transparent to the electromagnetic field, and it can also be transparent to the visible spectrum. The conductive element 2 is disposed outside the viewing glass 9. To reduce the influence of interfering radiation on the measuring results, a curved protective shield 10 made of a conductive material is positioned along the conductive element 2 and the viewing glass 9. The protective shield 10 is connected to ground and provides effective shielding from interfering radiation.

Figure 3:
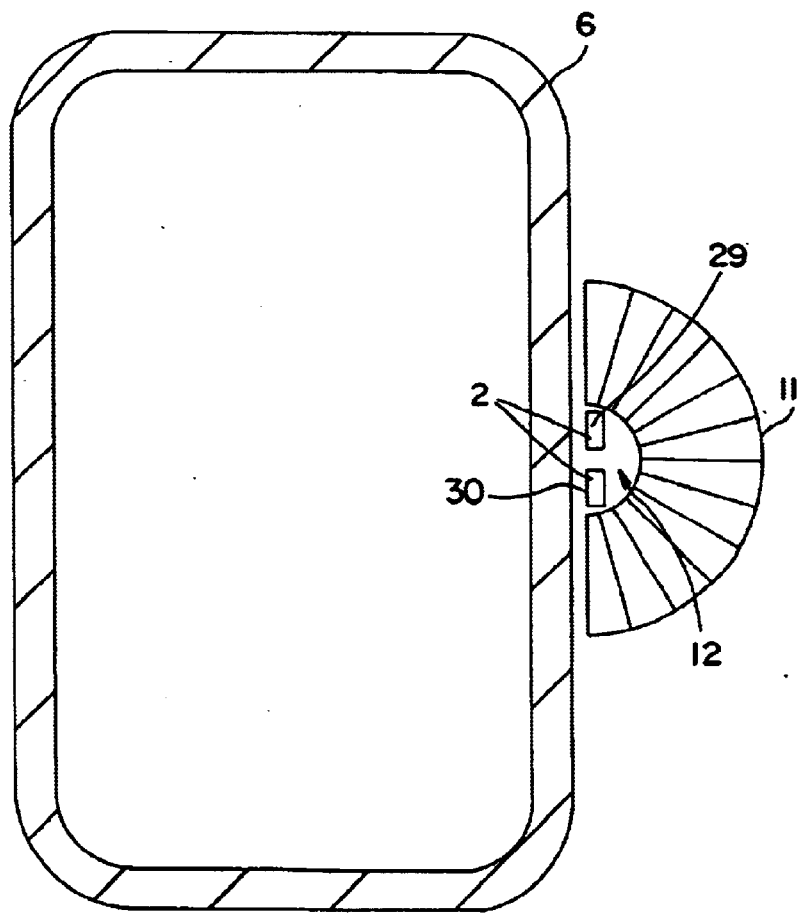
FIG. 3 shows a cross-section of a third embodiment of the present invention.
Figure 4A:
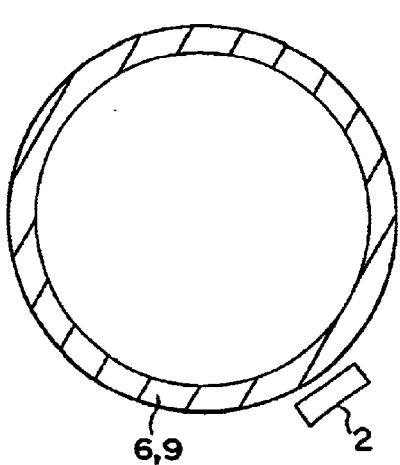
FIGS. 4A–4D show a cross-section of a several different types of conductive elements that may be used in connection with the present invention.
Figure 4B:
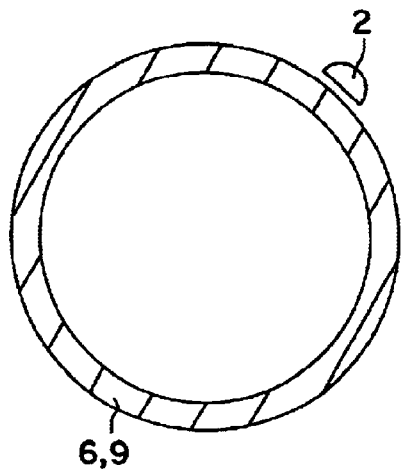
Figure 4C:
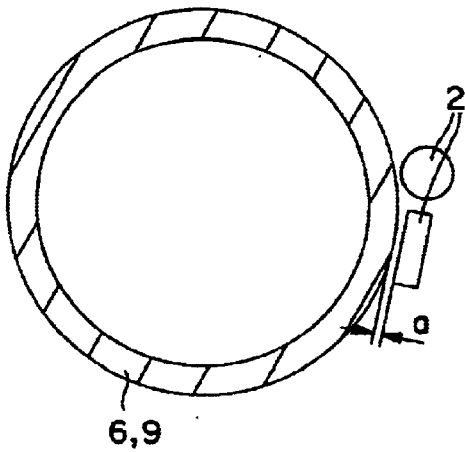
Figure 4D:
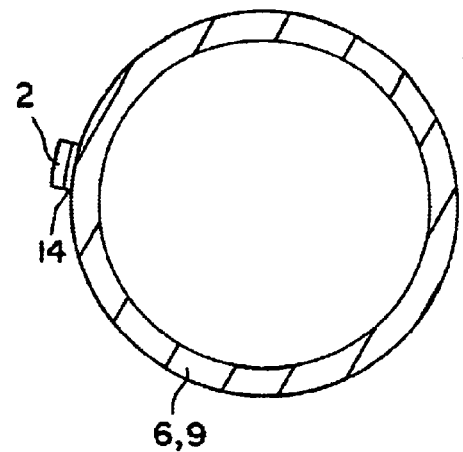

FIG. 3 shows a cross-section of a third embodiment of the present invention. The conductive element 2 is disposed on the side of the vessel 6. A curved protective shield 11 is provided to shield interfering radiation from the environment. The protective shield 11 has a semi-circular cross-section and its side edges extend to the immediate proximity of vessel 6. A dielectric material 12 is provided between the interior surface of the protective shield 11 and the conductive element 2. The protective shield 11 is mounted outside vessel 6 by means of any type of connection, the connection not being specifically depicted in the drawing. In the case shown, the conductive element 2 comprises two conductors 29, 30, with conductor 30 connected to ground. As described above, the double or multiple division of the conductive element 2 has a positive effect on the electromagnetic measuring field. Particularly when the protective shield 11 is used for protection against interfering radiation from the environment, the attenuation of the electromagnetic field in the interior of the vessel 6 is reduced.

FIG. 4 shows the cross-sections of several different types of conductive elements 2 that may be used in the present invention. In FIG. 4A, the conductive elements 2 is polygonal (e.g. rectangular) in shape. In FIG. 4B, the conductive elements 2 is semicircular in shape. In FIG. 4C, a pair of conductive elements 2 is shown, one being circular and the second being rectangular in shape. FIG. 4D shows a type of mounting of the conductive element 2 on the vessel 6. The rectangular conductive element 2 is glued to the outer vessel wall by means of an adhesive bond 14.

Figure 5:
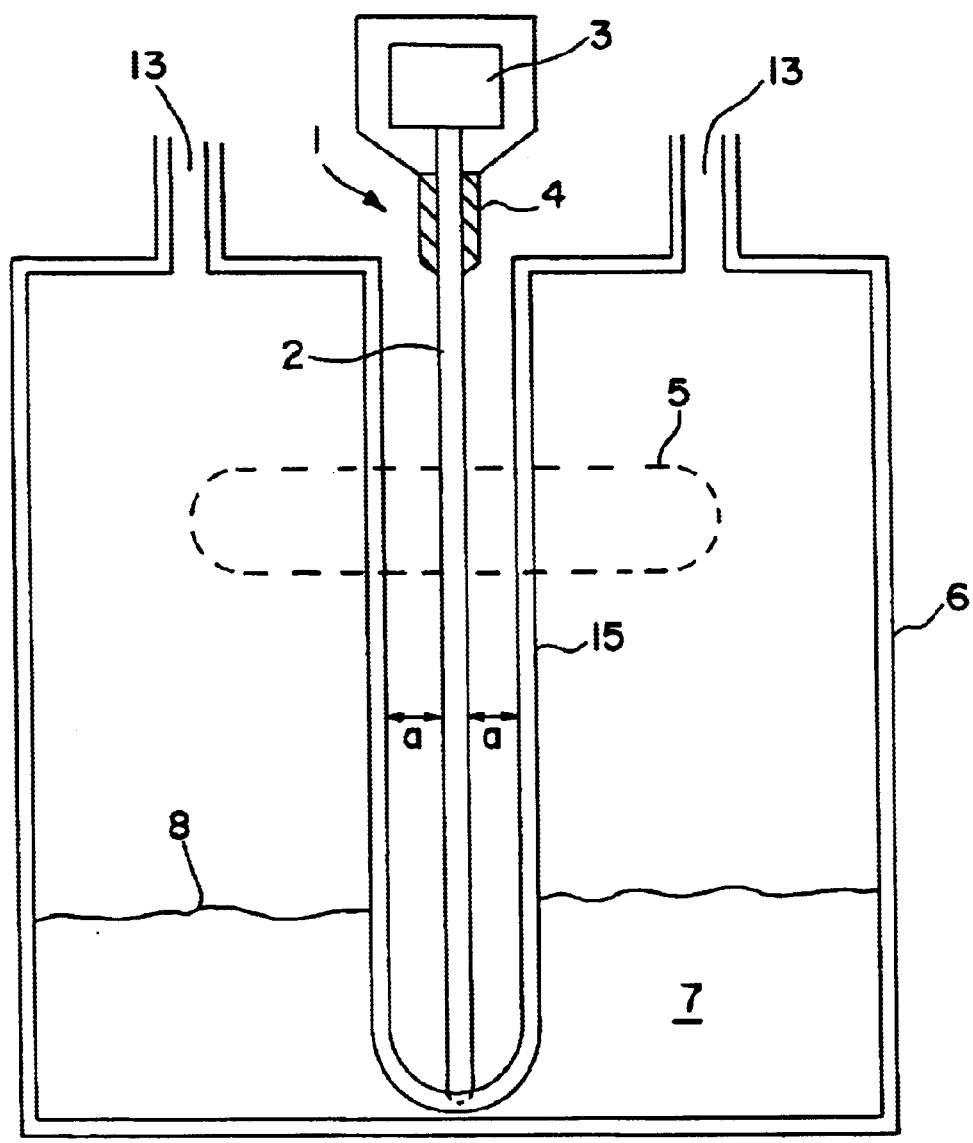
FIG. 5 shows a longitudinal section of a fourth embodiment of the present invention.

FIG. 5 shows a longitudinal section through a fourth embodiment of the present invention. In contrast to FIGS. 1 through 4 which show the conductive element 2 mounted outside the vessel 6, FIG. 5 shows an arrangement of the conductive element 2 within the vessel 6. The conductive element 2 is inserted into a dielectric sleeve 15. The sleeve 15 is made, for example, of glass. In FIG. 5, an additional dielectric medium in the form of air is located between the conductive element 2 and the sleeve 15. However, the conductive element may also be sheathed by dielectric material to isolate it from material 7. Furthermore, the conductive element 2 and the sleeve 15 may be formed either as separate components or as a single unit.

Figure 6:
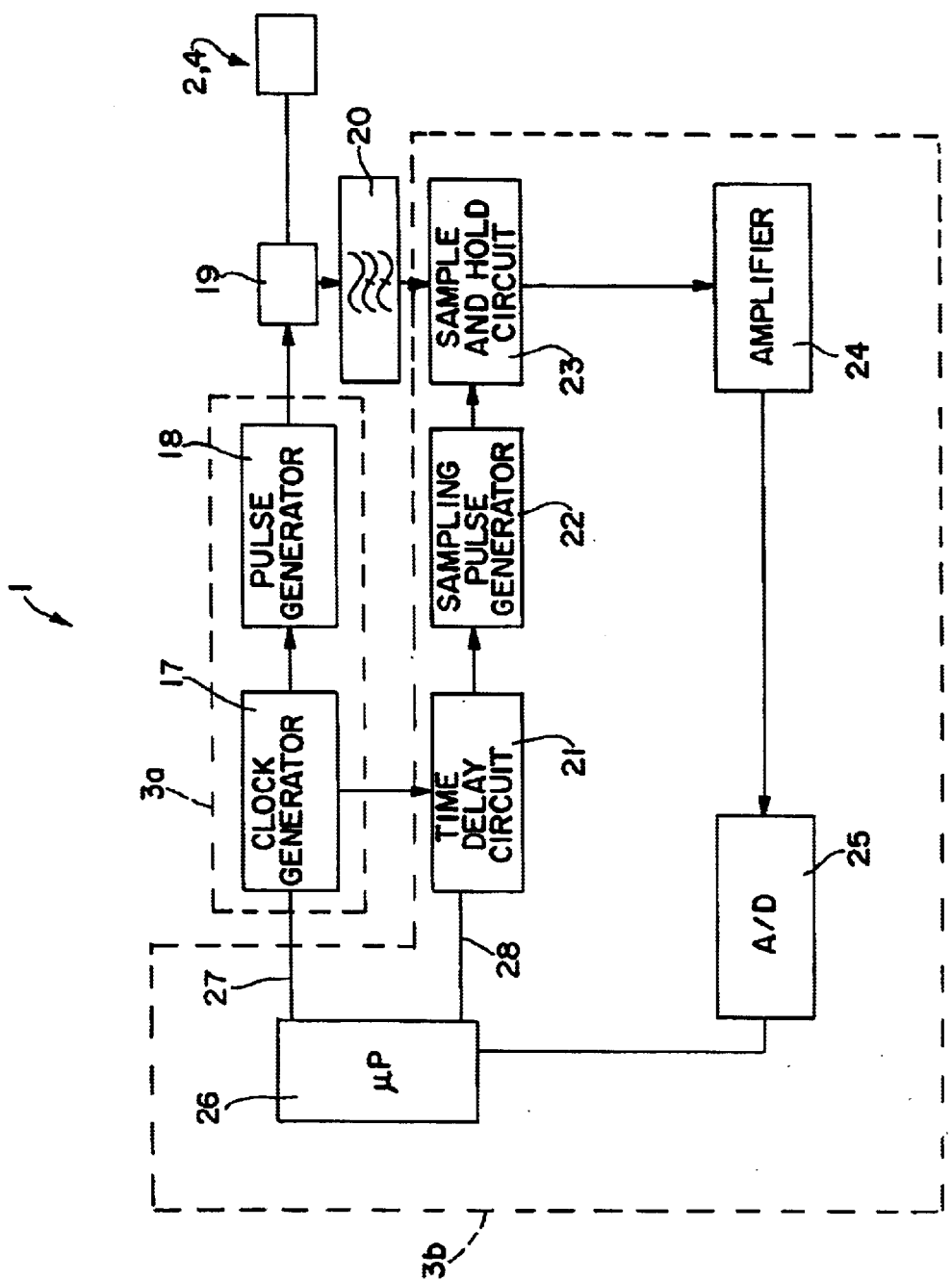
FIG. 6 shows a block diagram of a signal generating unit and a receiving/evaluation unit.

FIG. 6 shows a block diagram of the signal generating unit 3a and the receiving/evaluation unit 3b. The signal generating unit 3a includes a transmission clock generator 17 and a transmission pulse generator 18. The transmission clock generator 17 generates a transmission clock signal which is supplied to the transmission pulse generator 18 which generates a measuring signal. Preferably, the transmission pulse generator 18 produces electromagnetic measuring signals in the form of short low energy high frequency pulses. Such transmission pulse generators, as well as electronic circuits and receiving/evaluation units used in connection therewith, are described, for example, in U.S. Pat. No. 5,609,059.

The measuring signals are supplied to the conductive element 2 via the coupling unit 4. In reverse direction, reflected echo signals reach the receiving/evaluation unit 3b via the conductive element 2, the coupling unit 4, a directional coupler 19, and a high pass filter 20.

The receiving/evaluation unit 3b includes a time delay circuit 21, the input of which is connected to the transmission clock generator 17 for receiving the transmission clock signal. The time delay circuit 21 produces a sampling clock signal that corresponds to the transmission clock signal delayed by a variable delay time. The variable delay time is provided, for example, by means of a sawtooth generator. The sampling clock signal is supplied to a sampling pulse generator 22, which generates sampling pulses as a function of the sampling clock signal and supplies them to a first input of a sample-and-hold circuit 23. Transmission pulse and sampling pulse generators 18, 22 are preferably identical such that the signals they generate are distinguished only by the variable delay time. The reflected echo signals are supplied to a second input of the sample-and-hold circuit 23 via the directional coupler 19 and high pass filter 20. EP 0 875 772 describes in detail a receiving and evaluation unit that is very well suited for the present invention.

In operation, short transmission pulses are produced, preferably periodically with the transmission clock frequency. The reflected echo signals are supplied to the sample-and-hold circuit 23 in which a sampling pulse is superimposed on each echo signal and the resulting total signal is detected. The total signal is amplified by an amplifier 24, digitized by an analog-to-digital converter 25 that is arranged in series with the amplifier 24, and supplied as a sampling value to a microprocessor 26.

The total signal is a measure for the alignment of the echo signal and the sampling pulse. The echo signals arrive periodically, whereby successive sampling pulses are distinguished from each other by a time delay determined by the sawtooth function. Provided that successive echo signals do not differ significantly, the sampling-and-hold circuit 23 supplies a stroboscopic recording of the echo signals. This is normally the case since, in practice, the level of material does not change significantly in the time between successive transmission pulses.

The microprocessor 26 is connected via a first line 27 to the transmission clock generator 17 and the transmission pulse generator 18 and via a second line 28 to the time delay circuit 21 and the sampling pulse generator 22. In operation, microprocessor 26 initiates regular measuring cycles. During a measuring cycle, the electromagnetic measuring signals are periodically produced, as described above, and the reflected echo signals are sampled. A measuring cycle ends when a complete cycle of the time delays provided by the time delay circuit 21, for example by a cycle of a sawtooth function, has been completed. The individual sampling values are each recorded in conjunction with the assigned time delay. The propagation time is then determined using the recorded sampling values.

We claim:

1. A level measurement device for measuring the level of material in a vessel, comprising:
   a conductive element positioned at a predetermined distance from the material, a signal generating unit configured to generate an electromagnetic field which travels along said conductive element at least to the material level and produces an echo signal when it reaches the level of material in the vessel, and
   a receiving unit configured to receive said echo signal and determine the level of material in the vessel based on the propagation time of the echo signal.

2. The level measurement device of claim 1, wherein the conductive element is located outside of the vessel.

3. The level measurement device of claim 2, wherein the conductive element is mounted on the outside wall of the vessel.

4. The level measurement device of claim 3, wherein the conductive element is mounted using an adhesive bond.

5. The level measurement device of claim 2, further comprising a protective shield, said protective shield substantially preventing interfering radiation from interfering with the signals transmitted and reflected along said conductive element.

6. The level measurement device of claim 5, wherein said protective shield is connected to ground.

7. The level measurement device of claim 5, wherein said protective shield is located on the opposite side of the vessel from said conductive element.

8. The level measurement device of claim 5, wherein said conductive element is located between the vessel and said protective shield.

9. The level measurement device of claim 8, further comprising a dielectric material, said dielectric material being connected to said protective shield, and being located between said protective shield and said conductive element.

10. The level measurement device of claim 5, wherein said protective shield is formed to substantially enclose the sides of said conductive element facing away from the vessel.

11. The level measurement device of claim 10, wherein said protective shield has a semi-circular cross section.

12. The level measurement device of claim 1, wherein the conductive element comprises a pair of conductors.

13. The level measurement of claim 12, wherein one of said pair of conductors is connected to ground.

14. A level measurement device for measuring the level of material in a vessel, the device comprising:
   a conductive element positioned in the vessel at a predetermined distance from the material in the vessel,
   a protective sleeve positioned within the predetermined distance between the conductive element and the material in the vessel,
   a signal generating unit configured to generate an electromagnetic field which travels along said conductive element at least to the material level and produces an echo signal when it reaches the level of material in the vessel, and a receiving unit configured to receive said echo signal and determine the level of material in the vessel based on the propagation time of the echo signal.

15. The level measurement device of claim 14, further comprising a dielectric material positioned between the conductive element and the protective sleeve.

16. The level measurement device of claim 14, wherein the conductive element and the protective sleeve are formed as a single unit.

17. A level measurement device for measuring the level of material inside of a vessel, comprising:

a conductive element positioned outside of the vessel at a predetermined distance from the material, a signal generating unit configured to generate an electromagnetic field which travels along said conductive element at least to the material level and produces an echo signal when it reaches the level of material in the vessel, a receiving unit configured to receive said echo signal and determine the level of material in the vessel based on the propagation time of the echo signal, and a protective shield positioned outside the vessel to protect the echo signal from interfering radiation.

18. The level measurement device of claim 17, wherein said protective shield is located on the opposite side of the vessel from said conductive element.

19. The level measurement device of claim 17, wherein said conductive element is located between the vessel and said protective shield.

* * * * *